(12) United States Patent
Hosono

(10) Patent No.: US 6,973,849 B2
(45) Date of Patent: Dec. 13, 2005

(54) TRANSMISSION

(75) Inventor: Kiyohito Hosono, Aichi (JP)

(73) Assignee: Aichi Machine Industry Co., Ltd., Aichi (JP)

( * ) Notice: Subject to any disclaimer, the term of this patent is extended or adjusted under 35 U.S.C. 154(b) by 0 days.

(21) Appl. No.: 10/493,084

(22) PCT Filed: Oct. 15, 2002

(86) PCT No.: PCT/JP02/10689

§ 371 (c)(1),
(2), (4) Date: Apr. 16, 2004

(87) PCT Pub. No.: WO03/033942

PCT Pub. Date: Apr. 24, 2003

(65) Prior Publication Data

US 2004/0250638 A1    Dec. 16, 2004

(30) Foreign Application Priority Data

Oct. 17, 2001   (JP) .............................. 2001-319167

(51) Int. Cl.[7] .............................................. F16H 3/12
(52) U.S. Cl. .......................................... 74/330; 74/340
(58) Field of Search ......................... 74/330, 340, 339, 74/329

(56) References Cited

U.S. PATENT DOCUMENTS

| | | | | |
|---|---|---|---|---|
| 3,691,861 A | * | 9/1972 | Sturmer | 74/330 |
| 4,461,188 A | * | 7/1984 | Fisher | 74/330 |
| 4,640,393 A | * | 2/1987 | Nishimura et al. | 477/70 |
| 4,658,663 A | * | 4/1987 | Hiraiwa | 74/330 |
| 4,708,026 A | * | 11/1987 | Ikemoto | 74/331 |
| 5,950,781 A | * | 9/1999 | Adamis et al. | 74/330 |
| 6,044,931 A | * | 4/2000 | Reed et al. | 74/330 |
| 6,055,879 A | * | 5/2000 | Abe et al. | 74/330 |

* cited by examiner

*Primary Examiner*—Sherry Estremsky
(74) *Attorney, Agent, or Firm*—Donald S. Dowden; Cooper & Dunham LLP

(57) ABSTRACT

A transmission having a first input shaft X1 connecting a first clutch D1, a second input shaft X2, inserted in the first input shaft X1, and connecting to a second clutch D2, an output shaft Xo, a counter shaft Xs, and an idle shaft $X_R$, is provided in the present invention. In the transmission, a gear G17 of the counter shaft Xs engaging with a gear G3 fixedly carried on the first input shaft X1 and a coupling C4 attached to the gear G17, are arrayed in the side space SP of an outer gear G12 of the output shaft Xo.

2 Claims, 2 Drawing Sheets

X1: First input shaft  X2: Second input shaft  Xo: Output shaft
Xs: Counter shaft  $X_R$: Idle shaft  D1: First clutch
D2: Second clutch  G1~G7: Gears  C1~C4: Couplings X1: First input shaft  X2: Second input shaft  Xo: Output shaft Xs: Counter shaft  X$_R$: Idle shaft  D1: First clutch D2: Second clutch  G1~G7: Gears  C1~C4: Couplings

TRANSMISSION

FIELD OF THE INVENTION

This invention relates to a twin clutch type automotive transmission.

BACKGROUND OF THE INVENTION

Up to now, a twin-clutch type transmission has been provided, having a first input shaft X1 connecting to a first clutch D1, a second input shaft X2, inserted in said first input shaft X1, connecting to a second clutch D2, an output shaft Xo, and an idle shaft XR, wherein the $2^{nd}$, $4^{th}$ and $6^{th}$ speed drive gears G18, G19, G20 are fixedly carried on said first input shaft X1, the $1^{st}$, $3^{rd}$, $5^{th}$ and reverse drive gear G21, G22, G23, G24 are fixedly carried on said second input shaft X2, and the $2^{nd}$, $4^{th}$, and $6^{th}$ driven gears G25, G26, G27 respectively engaging with said three gears G18, G19, G20 of said first input shaft are rotatably carried on said output shaft Xo, further, the $1^{st}$, $3^{rd}$, $5^{th}$ driven gears G28, G29, G30 engaging with said three gears G21, G22, G23 of said second input shaft X2 are rotatably carried on said output shaft Xo, furthermore, a reverse driven gear G32 connecting to said gear G24 of said second input shaft through a gear G31 is rotatably carried on said output shaft Xo, said gear G31 being rotatably carried on said idle shaft $X_R$, still further, a output gear G12 connecting to a differential gear (4) is fixedly carried on said output shaft Xo, and coupling C5, C6, C7, C8 are respectively attached to said seven gears G25, G26, G27, G28, G29, G30, G32 to fix selectively to said output-shaft Xo, and said output gear G12 of said output shaft Xo is arranged in the clutch-most side.

In said transmission, a side space SP of said output gear G12 of said output shaft Xo is not especially utilized.

Nevertheless, in said conventional transmission (1), to ensure adequate space in which a plural number of gears corresponding to the numbers of speed stage changes are arranged, the lengths of said second input shaft X2 and said output shaft Xo should be expanded, so that the size of the shaft direction of said transmission (1) is too large, resulting in a troublesome installation procedure. In the case of the twin-clutch type transmission (1), especially in the case of a front wheel drive system where the engine is installed sideways, narrowing the transmission installation space, it is difficult to accommodate required shaft length.

DISCLOSURE OF THE INVENTION

To solve above described problems in said conventional transmission, the present invention provides a transmission having a first input shaft X1 connecting to a first clutch D1, and a second input shaft X2, inserted in said first input shaft X1, connecting to a second clutch D2, an output shaft Xo, a counter shaft Xs, and an idle shaft $X_R$, wherein a plural number of gears are rotatably carried on said first input shaft X1, a gear G3 is fixedly carried on said first input shaft X1, further, a plural number of couplings to fix selectively said rotatable gears to said first input shaft X1 are respectively attached to said rotatable gears, and a plural number of gears are fixedly carried on said second input shaft X2, and a plural number of gears engaging respectively with said rotatable gears of said first input shaft X1 are fixedly carried on said output shaft Xo, a plural number of gears engaging with said fixed gears excepting designated fixed gears of said second input shaft X2 are rotatably carried on said output shaft Xo, an output gear G12 connecting to a differential gear (4) is fixedly carried on said output shaft Xo at the clutch-most side, further, a plural number of couplings to fix selectably said rotatable gears of said output shaft Xo are respectively attached to said rotatable gears, a plural number of gears engaging respectively with said designated fixed gears of said second input shaft X2 being not engaged with said gears of said output shaft Xo, and a gear connecting to one of said gears of said second input shaft X2 engaging with said gears of said output shaft Xo through a gear carried fixedly or rotatably on said idle shaft $X_R$, are rotatably carried on said counter shaft Xs, a gear engaging with one of a plural number of said rotatable gears of said first input shaft X1 is fixedly carried on said counter shaft Xs, a gear G17 engaging with said fixed gear G3 of said first input shaft X1 is rotatably carried on said counter shaft Xs, and a plural number of couplings to fix selectively a plural number of said rotatable gears to said counter shaft Xs are attached to said rotatable gears, further said gears G17 of said counter shaft Xs engaging with said fixed gears G3 of said first input shaft X1 and said coupling C4 of said counter shaft Xs are arranged in a side space of said output gear of said output shaft Xo.

More precisely, the present invention provides a transmission wherein two gears G1, G2 are rotatably carried on said first input shaft X1, and a coupling C1 to fix selectively said two gears G1, G2 to said first input shaft X1 is attached between said two gears, three gears G4, G5, G6 are fixedly carried on said second input shaft X2, two gears G7, G8 engaging respectively with two rotable gears G1, G2 of said first input shaft X1 are fixedly carried on said output shaft Xo, two gears G9, G10 engaging respectably with two gears G4, G6 of said three fixed gears G4, G5, G6 of said second input shaft X2 are rotatably carried, and a coupling C2 to fix selectively, two rotatable gears G9, G10 to said output shaft Xo is attached between said two gear, a gear G13 engaging with one gear G5 of said gears G4, G5, G6 of said second input shaft X2 not engaging with said gears G9, G10 of said output shaft Xo, a gear G15 connecting to one gear G4 of said gears G4, G6 of said second input shaft X2 engaging with said gears G9, G10 of said output shaft Xo through a gear G14 carried fixedly or rotably on said idle shaft $X_R$, are rotatably carried on said counter shaft Xs, and a gear G16 engaging with one gear G1 of two rotatable gears G1, G2 of said first input shaft X1 is fixedly carried on said counter shaft Xs, and further, two couplings C3, C4 to fix selectively three rotatatable gears G13, G14, G15 to said counter shaft Xs are preferably attached to said rotatable gears. By arranging said gear G17 and said coupling C4 attached to said gear G17 in the side space of said output gear G12 of said output shaft Xo, the lengths of said second input shaft X2 and said output shaft Xo can be reduced, to provide a transmission having a small shaft size direction.

DESCRIPTION OF NOTATIONS

1 Transmission
2 Engine
3 Tire
4 Differential gear
X1 First input shaft
X2 Second input shaft
Xo Output shaft
Xs Counter shaft
$X_R$ Idle shaft
D1 First clutch D2 Second clutch
G1~G17 Gears
C1~C4 Couplings
S1~S4 Sleeves
H1~H7 Hubs
SP Side space of the output gear

PREFERRED EMBODIMENT OF THE INVENTION

Figure 1:
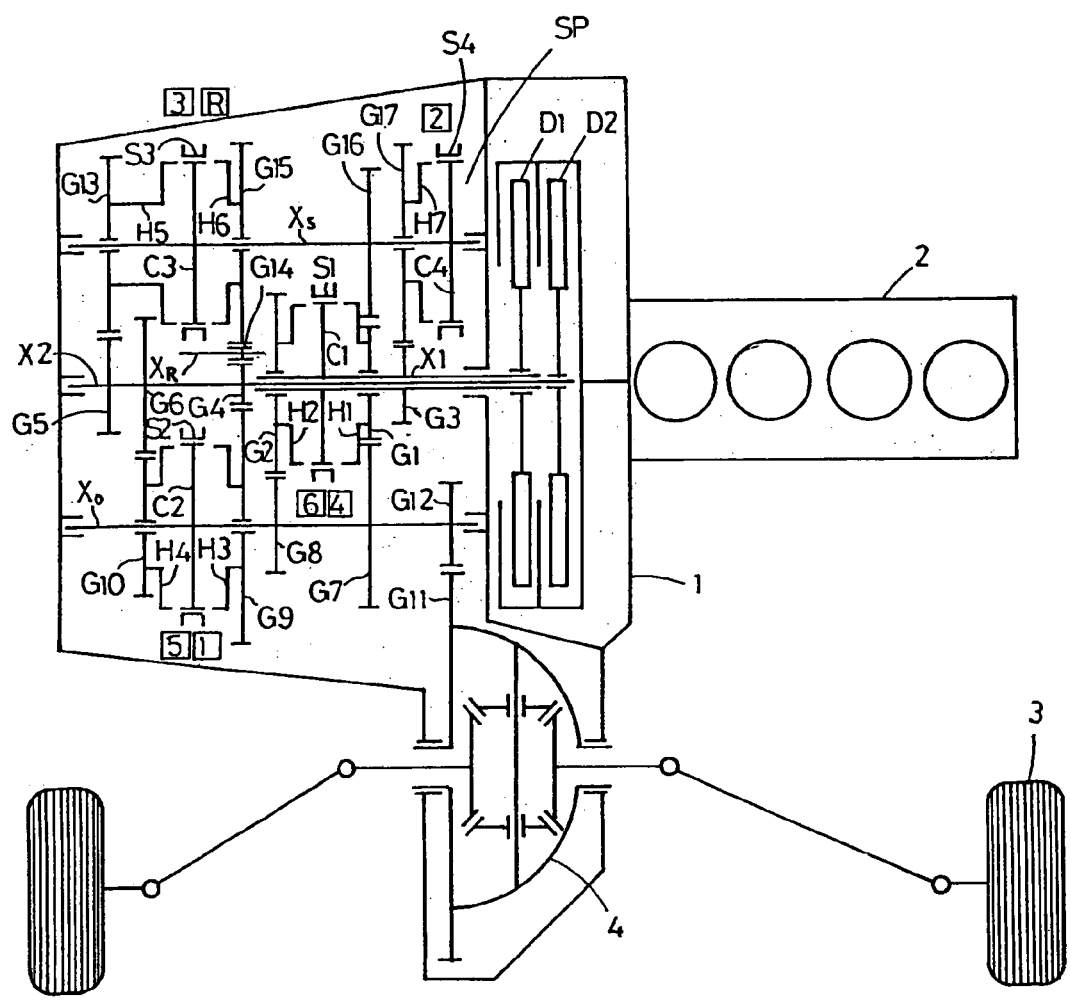
FIG. 1 is a descriptive drawing that shows an embodiment of this invention.
Figure 2:
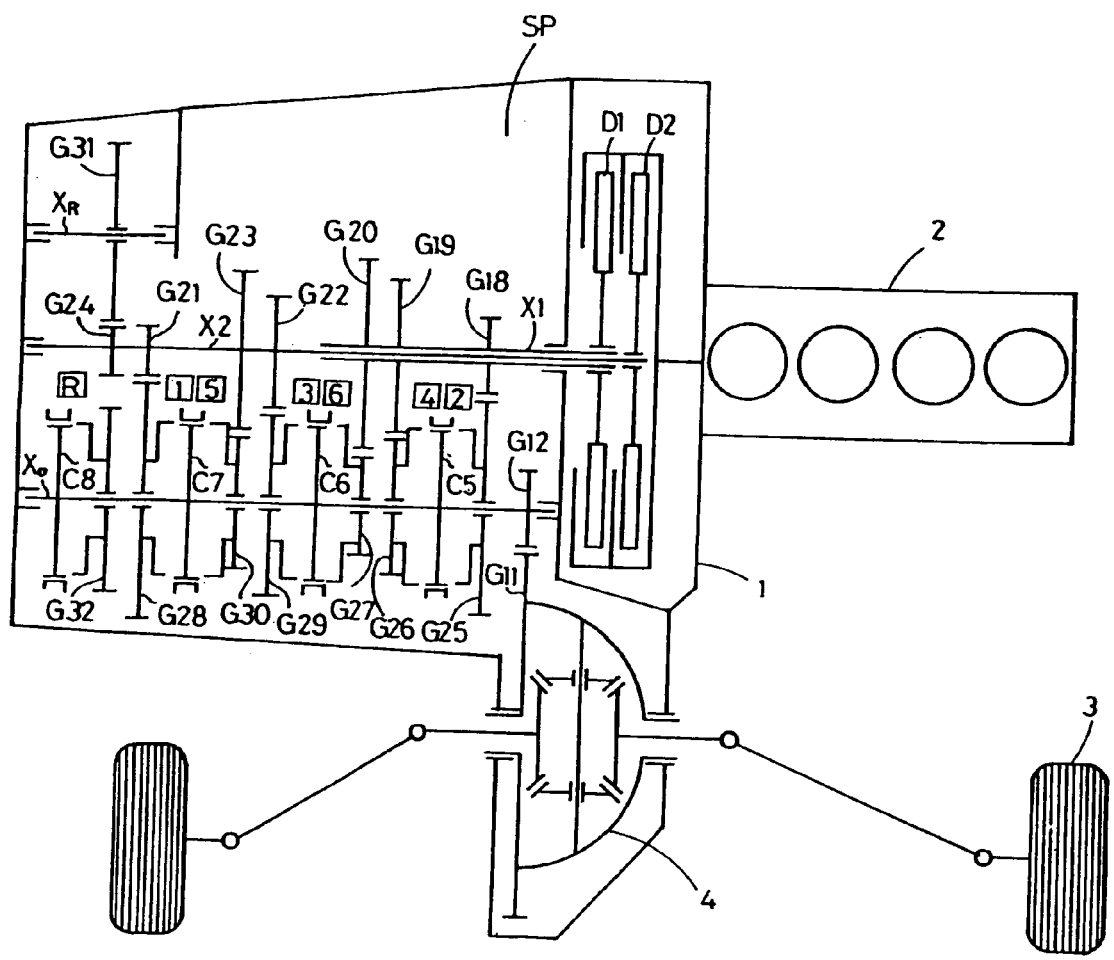
FIG. 2 is a descriptive drawing that shows a conventional transmission.

The present invention is described herein referring to an embodiment shown in FIG. 1. In said embodiment, a twin-clutch type six-speed automotive transmission (1) as shown in FIG. 1 is illustrated.

As shown in FIG. 1, said six-speed transmission (1) has a hollow, tube-like first input shaft X1, a second input shaft X2 inserted in said first input shaft X1, an output shaft Xo, a counter shaft Xs, and an idle shaft $X_R$, and a first clutch D1 and a second clutch D2 are connected respectively to said first input shaft X1 and said second input shaft X2 to transmit power from an engine (2) to said shafts X1, X2.

Two drive gears G1, G2 for the $4^{th}$-speed and $6^{th}$-speed are rotatably carried on said first input shaft X1, a drive gear G3 for the $2^{nd}$-speed is fixedly carried on said first input shaft X1, said gears G1, G2 have hubs H1, H2 respectively, and a coupling C1 having a sleeve S1 is attached between said gears G1, G2.

Drive gears G4, G5, G6 for the $1^{st}$-speed, $3^{rd}$-speed and $5^{th}$-speed are fixedly carried on said second input shaft X2 respectively.

Driven gears G7, G8, for the $4^{th}$-speed and $6^{th}$-speed engaging with the $4^{th}$ speed and $6^{th}$ speed drive gears G1, G2 of said first input shaft X1 are fixedly carried on said output shaft Xo, driven gears G9, G10 for the $1^{st}$-speed and $5^{th}$-speed engaging with the $1^{st}$-speed and $5^{th}$-speed gears G4, G6 of said second input shaft X2 are rotatably carried, an output gear G12 engaging with a gear G11 of a differential gear (4) to transmit power to the tire (3) is fixedly carried on said output shaft Xo, said gears G9, G10 have hubs H3, H4, respectively and a coupling C2 having a sleeve S2 is attached between said gears G9, G10.

A driven gear G13 for the $3^{rd}$-speed engaging with said gear G5 of said second input shaft X2, and a driven gear G15 for reverse connecting to said gear G4 of said second input shaft X2 through a gear G14 fixedly carried on said idle shaft $X_R$, are rotatably carried on said counter shaft Xs, a gear G16 engaging with said rotatable gear G1 of said first input shaft X1 is fixedly carried on said counter shaft Xs, a driven gear G17 for the $2^{nd}$-speed engaging with said gear G3 of said first input shaft X1 is rotatably carried on said counter shaft Xs, said gears G13, G15 have hubs H5, H6 respectively, a coupling C3 having a sleeve S3 is attached between said gears G13, G15, said gear G17 has a hub H7 and a coupling C4 having a sleeve S4 is attached to said gear G17.

In this invention, said gear G14 of said idle shaft $X_R$, may be rotatably carried on said idle shaft $X_R$.

In the above described transmission, said output gear G12 is arranged at the clutch- most side, and said gear G17 carried rotatably on said counter shaft Xs and said coupling C4 attached to said gear G17, are respectively arranged in a side space SP of said output gear G12 of said output shaft Xo. As described above, by arranging said gear G17 of said counter shaft Xs an said C4 attached to said gear G17 in the side space SP of said output gear G12 of said output shaft Xo, the shaft lengths of said second input shaft X2 and said output shaft Xo can be reduced to provide a transmission (1) having a small size shaft direction. The action of said transmission (1) is illustrated bellow.

[$1^{st}$ Speed]

Said sleeve S2 is slid toward the $1^{st}$ speed driven gear G9 to connect said coupling C2 and said hub H3 of said gear G9, and the rotation of said second input shaft X2 is transmitted to said output shaft Xo through the $1^{st}$ speed driven gear G9 from the $1^{st}$ speed drive gear G4, and the rotation of said output shaft Xo is transmitted to said gear G11 of said differential gear (4) through said output gear G12, to attain $1^{st}$ speed.

[$2^{nd}$ Speed]

Said sleeve S4 is slid toward the $2^{nd}$ speed driven gear G17 to connect said coupling C4 and said hub H7 of said gear G17, and the rotation of said first input shaft X1 is transmitted to said counter shaft Xs through the $2^{nd}$ speed driven gear G17 from the $2^{nd}$ speed drive gear G3, and further transmitted to said output shaft Xo through said gear G1 of said first input shaft X1 and said gear G7 of said output shaft Xo from said gear G16 of said counter shaft Xs, and the rotation of said output shaft Xo is transmitted to said gear G11 of said differential gear (4) through said output gear G12, to attain $2^{nd}$ speed.

[$3^{rd}$ Speed]

Said sleeve S3 is slid toward the $3^{rd}$ speed driven gear G13 to connect said coupling C3 and said hub H5 of said gear G13, and the rotation of said second input shaft X2 is transmitted to said counter shaft Xs through the $3^{rd}$ speed driven gear G13 from the $3^{rd}$ speed drive gear G5, and further transmitted to said output shaft Xo through said gear G1 of said first input shaft X1 and said gear G7 of said output shaft Xo from said gear G16 of said counter shaft G16, and the rotation of said output shaft Xo is transmitted to said gear G11 of said differential gear (4) through said output gear G12, to attain $3^{rd}$ speed.

[$4^{th}$ Speed]

Said sleeve S1 is slid toward the $4^{th}$ speed drive, gear G1 to connect said coupling C1 and said hub H1 of said gear G1, and the rotation of said first input shaft X1 is transmitted to said output shaft Xo through the $4^{th}$ speed driven gear G7 from the $4^{th}$-speed drive gear G1, and the rotation of said output shaft Xo is transmitted to said gear G11 of said differential gear (4) through said output gear G12, to attain $4^{th}$ speed.

[$5^{th}$ Speed]

Said sleeve S2 is slid toward 5-speed driven gear G10 to connect said coupling C2 and said hub H4 of said gear G10, and the rotation of said second input shaft X2 is transmitted to said output shaft Xo through the $5^{th}$ speed driven gear G10 from the $5^{th}$ speed drive gear G6, and the rotation of said output shaft Xo is transmitted to said gear G11 of said differential gear (4) through said output gear G12, to attain $5^{th}$ speed.

[$6^{th}$ Speed]

Said sleeve S1 is slid toward the $6^{th}$ speed drive gear G2 to connect said coupling C1 and hub H2 of said gear G2, and the rotation of said first input shaft X1 is transmitted to said output shaft Xo through the $6^{th}$ speed driven gear G8 from the $6^{th}$ speed drive gear G2, and the rotation of said output shaft Xo is transmitted to said gear G11 of said differential gear (4) through said output gear G12, to attain $6^{th}$ speed.

[Reverse]

Said sleeve G3 is slid toward said reverse driven gear G15 to connect said coupling C3 and said hub H6 of said gear G15, and the rotation of said second input shaft X2 is transmitted to said counter shaft Xs through said gear G14 of said idle shaft $X_R$ and said reverse driven gear G15 from said gear G4 of said second input shaft X2, and further transmitted to said output shaft Xo through said gear G1 of said first input shaft X1 and said gear G7 of said output shaft Xo from said gear G16 of said counter shaft Xs, and the rotation of said output shaft Xo is transmitted to said gear G11 of said differential gear (4) through said output gear G12, to attain reverse.

INDUSTRIAL UTILITY

In the present invention, the lengths of the input shaft and the output shaft can be reduced to provide a transmission having a small shaft size direction, so that said transmission can be easily installed in an automobile.

What is claimed is:

1. A transmission having a first input shaft connecting to a first clutch, a second input shaft, inserted in said first input shaft, connecting to a second clutch, an output shaft, a counter shaft and an idle shaft, wherein a plural number of gears are rotatably carried on said first input shaft, and a gear is fixedly carried on said first input shaft, and further a plural number of couplings to fix selectively said rotatable gears to said first input shaft are respectively attached to said rotatable gears, a plural number of gears are fixedly carried on said second input shaft, a plural number of gears engaging with said rotatable gears of said first input shaft are fixedly carried on said output shaft, a plural number of gears engaging with said fixed gears excepting designated fixed gears of said second input shaft are rotatably carried on said output shaft, an output gear connecting to a differential gear is fixedly carried on said output shaft at the clutch- most side, and further a plural number of couplings to fix selectively said rotatable gears of said output shaft are respectively attached to said rotatable gears, a plural number of gears engaging respectively with said designated fixed gears of said second input shaft being not engaged with said gears of said output shaft, and a gear connecting to one of said gears of said second input shaft engaging with said gears of said output shaft through a gear carried fixedly or rotatably on said idle shaft, are rotatably carried on said counter shaft, a gear engaging with one of a plural number of said rotatable gears of said first input shaft is fixedly carried on said counter shaft, a gear engaging with said fixed gear of said first input shaft is rotatably carried on said counter shaft, and a plural number of couplings to fix selectively a plural number of said rotatable gears to said counter shaft are attached to said rotatable gears, further, said gears of said counter shaft engaging with said fixed gears of said first input shaft and said couplings of said counter shaft are arranged in a side space of said output gear of said output shaft.

2. A transmission in accordance with claim 1, wherein two gears are rotatably carried on said first input shaft and a coupling to fix selectively said two gears to said first input shaft is attached between said two gears, three gears are fixedly carried on said second input shaft, two gears engaging respectively with two rotable gears of said first input shaft are fixedly carried on said output shaft, two gears engaging respectably with two of said three fixed gears of said second input shaft are rotatably carried, and a coupling to fix selectively two rotatable gears to said output shaft is attached between said two gears, a gear engaging with one of said gears of said second input shaft not engaging with said gears of said output shaft is rotatably carried on said counter shaft, and a gear engaging with one of two rotatable gears of said first input shaft is fixedly carried on said counter shaft, and further two couplings to fix selectably three rotable gears to said counter shaft are attached to said rotatable gears.

* * * * *